(12) United States Patent
Nakai (10) Patent No.: US 8,812,747 B2
(45) Date of Patent: Aug. 19, 2014

(54) NETWORK APPARATUS THAT SENDS BACK EQUIPMENT INFORMATION, METHOD OF CONTROLLING THE APPARATUS, AND STORAGE MEDIUM

(75) Inventor: Hironobu Nakai, Komae (JP)

(73) Assignee: Canon Kabushiki Kaisha, Tokyo (JP)

(*) Notice: Subject to any disclaimer, the term of this patent is extended or adjusted under 35 U.S.C. 154(b) by 182 days.

(21) Appl. No.: 13/554,216

(22) Filed: Jul. 20, 2012

(65) Prior Publication Data

US 2013/0027727 A1  Jan. 31, 2013

(30) Foreign Application Priority Data

Jul. 29, 2011  (JP) .................................. 2011-167040

(51) Int. Cl.
*G06F 3/00* (2006.01)
*H04L 12/24* (2006.01)

(52) U.S. Cl.
CPC .................................. *H04L 41/0213* (2013.01)
USPC ............................................ 710/10; 710/30

(58) Field of Classification Search
CPC ..... H04L 41/0213; G06F 17/30; H04W 48/16
USPC ....................................................... 710/10, 30
See application file for complete search history.

(56) References Cited

FOREIGN PATENT DOCUMENTS

JP     2008-27128     2/2008

*Primary Examiner* — Farley Abad
(74) *Attorney, Agent, or Firm* — Carter, DeLuca, Farrell & Schmidt, LLP (57) ABSTRACT

A network apparatus which enables, even when different information processing apparatuses use software programs different in device recognition capability, each information processing apparatus to easily acquire equipment information from the network apparatus and manage the network apparatus. The apparatus is connectable to a management terminal via a network and capable of sending back a response containing equipment information in response to an equipment information acquisition request from the terminal. Upon receipt of the request from the terminal, the apparatus determine whether or not the request contains a plurality of identical object identifiers. When the request contains a plurality of identical object identifiers, the apparatus decides whether or not to send back different equipment information items in association with the respective identical object identifiers. Then, the network apparatus sends back a response packet containing the equipment information according to the decision.

9 Claims, 8 Drawing Sheets

|  | FIRST TIME | SECOND TIME | THIRD TIME |
|---|---|---|---|
| FIRST BUFFER | 11 | 57 | 123 |
| SECOND BUFFER | 0 | 11 | 57 |
| THIRD BUFFER | 0 | 0 | 11 |

FIG.9

|  | FIRST TIME | | SECOND TIME | |
|---|---|---|---|---|
| FIRST BUFFER | 2010/12/12 20:30 | 1013 | 2010/12/12 21:15 | 1121 |
| SECOND BUFFER | 2010/12/12 20:00 | 900 | 2010/12/12 21:00 | 1051 |
| THIRD BUFFER | 2010/12/12 19:00 | 814 | 2010/12/12 20:00 | 900 |
| FOURTH BUFFER | 2010/12/12 18:00 | 615 | 2010/12/12 19:00 | 814 |

NETWORK APPARATUS THAT SENDS BACK EQUIPMENT INFORMATION, METHOD OF CONTROLLING THE APPARATUS, AND STORAGE MEDIUM

BACKGROUND OF THE INVENTION

1. Field of the Invention

The present invention relates to a network apparatus connected to a network, a method of controlling the apparatus, and a storage medium.

2. Description of the Related Art

In general, there has been known a method in which a network apparatus (hereinafter also referred to as "a network device", e.g. an image forming apparatus, such as an MFP) directly connected to a network is managed using a device management protocol, such as SNMP (simple network management protocol). Further, there has been known a system in which an information processing apparatus, such as a personal computer, is connected to a network to perform centralized control of devices connected to the information processing apparatus and the above-mentioned network device such that the devices connected thereto can be distinguished from the network device (see e.g. Japanese Patent Laid-Open Publication No. 2008-27128).

In the device management method described in Japanese Patent Laid-Open Publication No. 2008-27128, the information processing apparatus needs to determine in advance whether or not a device is directly connected to a network (i.e. whether or not the device is a network device), and acquire device information on the network device using SNMP when the device is a network device.

On the other hand, as for a device connected e.g. via USB to the information processing apparatus connected to the network, the information processing apparatus manages the device by sending a request command for acquisition of device information, using a protocol suitable for the connected device. In other words, in the case of making a request for acquisition of device information, the information processing apparatus recognizes the type of an associated device in advance and changes a request command according to the type.

Further, there has been known another device management method in which an information processing apparatus acquires e.g. a system name or the like uniquely assigned to a network device, using a management protocol. In this method, the information processing apparatus changes a request command to a command for making a query to the network device using identification information, such as the acquired system name or the like, to thereby acquire device information from the network device.

However, it is difficult for the information processing apparatus to determine in advance whether a device is connected to a network directly or via another information processing apparatus. When it is impossible to determine in advance how the device is connected to the network, the information processing apparatus cannot change the request command, resulting in a trouble in gathering necessary device information.

MIB (management information base) information that can be acquired using SNMP includes e.g. two types of MIB variables, i.e. scalar and table. The scalar MIB variable has a single value. For example, a scalar MIB object sysDescr (see 203 in FIG. 2) is read-only information. The value of this MIB object is a character string describing a network device, and is a type of information which has only one value associated with the network device.

On the other hand, the table MIB variable can show a plurality of similar information items as table information. For example, it is possible to show information on toner as a consumable using values of a MIB object "prtMarkerSuppliesDescription" (see 310 in FIG. 3) such that information items on four color toners, i.e. cyan (C) toner, magenta (M) toner, yellow (Y) toner, and black (K) toner, can be separately listed.

In a general information processing apparatus, device identification is performed using scalar information which has only one value associated with a network device and is read-only, and then optimization is performed e.g. by switching logic for acquisition of detailed management information.

For this reason, between information processing apparatuses using respective different software programs, a case occurs where one information processing apparatus can identify a device, but another cannot. In this case, detailed information on a network device and the status of the network device can be managed only in information processing apparatuses using software programs capable of identifying the device, but information processing apparatuses using the other software programs cannot manage the device, which degrades user friendliness.

SUMMARY OF THE INVENTION

The present invention provides a network apparatus which enables, even when different information processing apparatuses use software programs different in device recognition capability, each information processing apparatus to easily acquire equipment information from the network apparatus and manage the network apparatus, a method of controlling the network apparatus, and a storage medium.

In a first aspect of the present invention, there is provided a network apparatus connectable to a management terminal via a network, comprising a transmission unit configured to send back a response containing equipment information in response to a request transmitted from the management terminal, a determination unit configured to be operable when the request is received from the management terminal, to determine whether or not a plurality of identical object identifiers are contained in the request, a decision unit configured to be operable when it is determined by the determination unit that a plurality of identical object identifiers are contained in the request, to decide whether or not to send back different items of the equipment information in association with the respective identical object identifiers, and the transmission unit sends back a response containing the equipment information according to decision by the decision unit.

In a second aspect of the present invention, there is provided a method of controlling a network apparatus connectable to a management terminal via a network, comprising sending back a response containing equipment information in response to a request transmitted from the management terminal, determining, when the request is received from the management terminal, whether or not a plurality of identical object identifiers are contained in the request, deciding, when it is determined that a plurality of identical object identifiers are contained in the request, deciding whether or not to send back different items of the equipment information in association with the respective identical object identifiers, and sending back a response containing the equipment information according to the decision.

In a third aspect of the present invention, there is provided a non-transitory storage medium storing a computer-readable program for causing a computer to execute a method of controlling a network apparatus connectable to a management terminal via a network, wherein the method comprises sending back a response containing equipment information in response to a request transmitted from the management terminal, determining, when the request is received from the management terminal, whether or not a plurality of identical object identifiers are contained in the request, deciding, when it is determined that a plurality of identical object identifiers are contained in the request, whether or not to send back different items of the equipment information in association with the respective identical object identifiers, and sending back a response containing the equipment information according to the decision.

According to the present invention, in the case of acquiring equipment information from an associated network apparatus, even when different information processing apparatuses as management terminals use software programs different in device recognition capability, each information processing apparatus can easily acquire the equipment information and manage the network apparatus without having to configure special settings.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
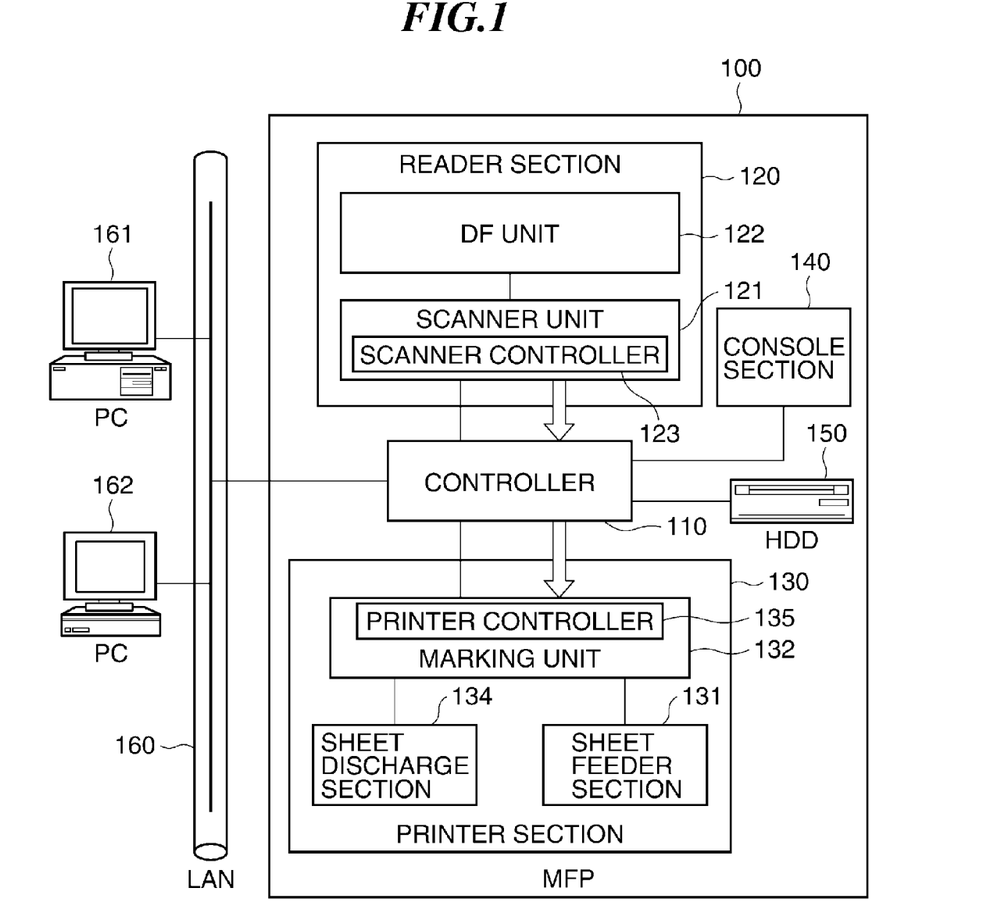
FIG. 1 is a diagram of an example of a network system using an MFP as a network apparatus according to a first embodiment of the present invention.

FIG. 1 is a diagram of an example of a network system using a network apparatus according to a first embodiment of the present invention. In the present embodiment, the network apparatus is implemented e.g. by an image forming apparatus, such as an MFP (multifunction peripheral). However, the network apparatus of the present invention is not limited to an MFP or the like image forming apparatus.

In the network system shown in FIG. 1, the MFP (image forming apparatus) 100 is connected to a network, such as a LAN 160. Further, connected to the LAN 160 are PCs (personal computers) 161 and 162 as information processing apparatuses. In other words, the MFP 100 is connectable to the PCs 161 and 162 via the network. Although not shown in FIG. 1, not only other PCs but also other MFPs, printers, and so forth can be connected to the LAN 160. Further, a printer or the like image forming apparatus is sometimes connected to each of the PCs 161 and 162.

The MFP 100 has a plurality of functions, such as a copy function and a printer function. Note that the image forming apparatus may be implemented by an SFP (single-function peripheral) having only a copy function or a printer function.

The MFP 100 has a controller 110. The controller 110 is connected to a reader section 120 and a printer section 130. The controller 110 receives various kinds of data from the reader section 120 and the printer section 130. Further, the controller 110 transmits various kinds of commands to the reader section 120 and the printer section 130. Furthermore, the controller 110 is connected to the PCs 161 and 162 via the LAN 160 to receive image data and control commands from the PCs 161 and 162. The LAN 160 is implemented e.g. by an Ethernet (registered trademark). Each of the PCs 161 and 162 is also referred to as a management terminal, and monitors the apparatus configuration and current status of the MFP 100.

The reader section 120 optically reads an image on an original to obtain image data. The reader section 120 comprises a scanner unit 121 and a document feeder unit (DF unit) 122. An original is conveyed by the document feeder unit 122 to a position where the scanner unit 121 can read the original, and an image on the original is read by the scanner unit 121. The scanner unit 121 includes a scanner controller 123, and the scanner controller 123 controls the scanner unit 121 and the document feeder unit 122 based on instructions from the controller 110.

The printer section 130 comprises a sheet feeder section 131, a marking unit (image forming unit) 132, and a sheet discharge section 134. The marking unit 132 includes a printer controller 135, and the printer controller 135 controls the sheet feeder section 131, the marking unit 132, and the sheet discharge section 134 under the control of the controller 110.

The sheet feeder section 131 contains printing sheets, and a printing sheet is conveyed from the sheet feeder section 131 to the marking unit 132. The marking unit 132 forms an image corresponding to image data e.g. by an electrophotographic process. Then, after completion of the image formation (printing), the sheet is discharged by the sheet discharge section 134. Note that in the sheet discharge section 134, it is possible to perform processing, such as sorting and stapling, on printed sheets.

The sheet feeder section 131 comprises a plurality of sheet feeder units. Each sheet feeder units can contain one of a plurality of types of sheets, including a type of plain sheets and a type of glossy sheets. Further, sheets printed in the printer section 130 can be set in a selected one of the sheet feeder units again. Examples of the sheet feeder unit include a sheet feed cassette, a sheet feed deck, and a manual feed tray.

A console section 140 comprises hard keys, a liquid crystal display, and a touch panel attached to the surface of the liquid crystal display. A user instruction is received via the console section 140. On the liquid crystal display of the console section 140, not only soft keys but also the functions and status of the MFP 100 are displayed. A command corresponding to a user instruction received via the console section 140 is sent to the controller 110. In the example shown in FIG. 1, the MFP 100 is provided with an HDD (hard disk drive) 150. The HDD 150 stores various settings associated with the MFP 100, image data, and so forth.

The MFP 100 has a plurality of functions, such as a copy function, an image data transmission function, and a printer function. In the case of using the copy function, the controller 110 causes the reader section 120 to read image data on an original, and then causes the printer section 130 to perform printing based on the image data, as described above.

In the case of using the image data transmission function, the controller 110 converts image data obtained by reading using the reader section 120 into code data and sends the code data to the PC 161 or 162 via the LAN 160. In the case of using the printer function, the controller 110 converts code data (print data) received from the PC 161 or 162 via the LAN 160 into image data and sends the image data to the printer section 130. The printer section 130 performs printing based on the received image data. Note that the configuration of the controller 110 will be described hereinafter.

Next, a description will be given of a general method (hereinafter referred to as "the standard technique") used by the PC 161 or 162 for acquisition of configuration information from the MFP 100 as a network apparatus.

Now, a description is given of a method of acquiring information from a network apparatus, which is based on RFCs (Requests for Comments) issued by the IETF (Internet Engineering Task Force) for the standardization of a technique for use in the Internet.

In general, SNMP is used as an information management protocol for a network apparatus. A network apparatus managed using SNMP stores MIB information. In response to an SNMP request from a management terminal (the PC 161 or 162 appearing in FIG. 1), the network apparatus sends a response (MIB information) to the management terminal in response to the SNMP request, and the management terminal manages the network apparatus based on the MIB information. Note that the format of the MIB information is also standardized by the IEFT.

MIB information that can be acquired by SNMP includes a MIB variable of the scalar type and a MIB variable of the table type. Hereafter, a MIB variable is also referred to as a MIB object. Now, a MIB object "sysDescr" will be described as an example of the scalar type.

Figure 2:
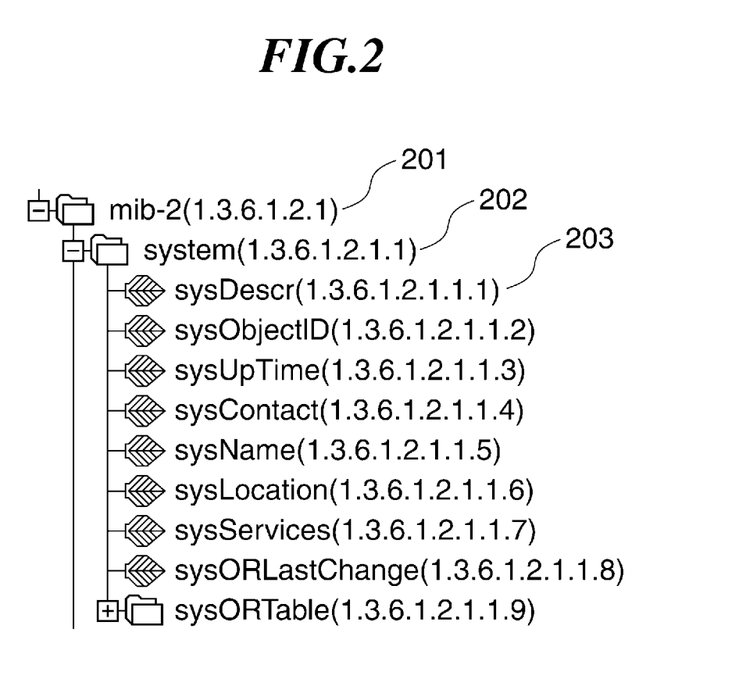
FIG. 2 is a diagram of an example of the arrangement of MIB objects in a portion of a MIB tree.

FIG. 2 is a diagram of an example of the arrangement of MIB objects in a portion of a MIB tree.

Referring to FIG. 2, a MIB object "sysDescr" 203 has an object identifier defined by RFC 1213. According to RFC 1213, a MIB object "system" 202 is defined as "system OBJECT IDENTIFIER::={mib-2 1}". This means that the OID (object identifier) of "system" 202 indicates that "system" 202 is a first entry in a subtree under mib-2 (201).

RFC 1213 defines "sysDescr" 203 as follows:
sysDescr OBJECT-TYPE
SYNTAX DisplayString (SIZE (0 ... 255))
ACCESS read-only
STATUS mandatory
DESCRIPTION
"A textual description of the entity. This value should include the full name and version identification of the system's hardware type, software operating-system, and networking software. It is mandatory that this only contain printable ASCII characters."
::={system 1}

This indicates that "sysDescr" 203 is a first entry in a subtree under the above-mentioned MIB object "system" 202.

The subtree of "system" 202 does not have a table structure (i.e. no table entries). For this reason, for example, the OID of "sysDescr" 203, which is (1.3.6.1.2.1.1.1), is represented in the SNMP protocol as "sysDescr.0 (1.3.6.1.2.1.1.1.0)" which indicates a scalar variable. In actuality, it is possible to acquire a value of "SNMPv2-MIB::sysDescr.0=STRING: AAA printer" (i.e. a character string "AAA printer").

Figure 3:
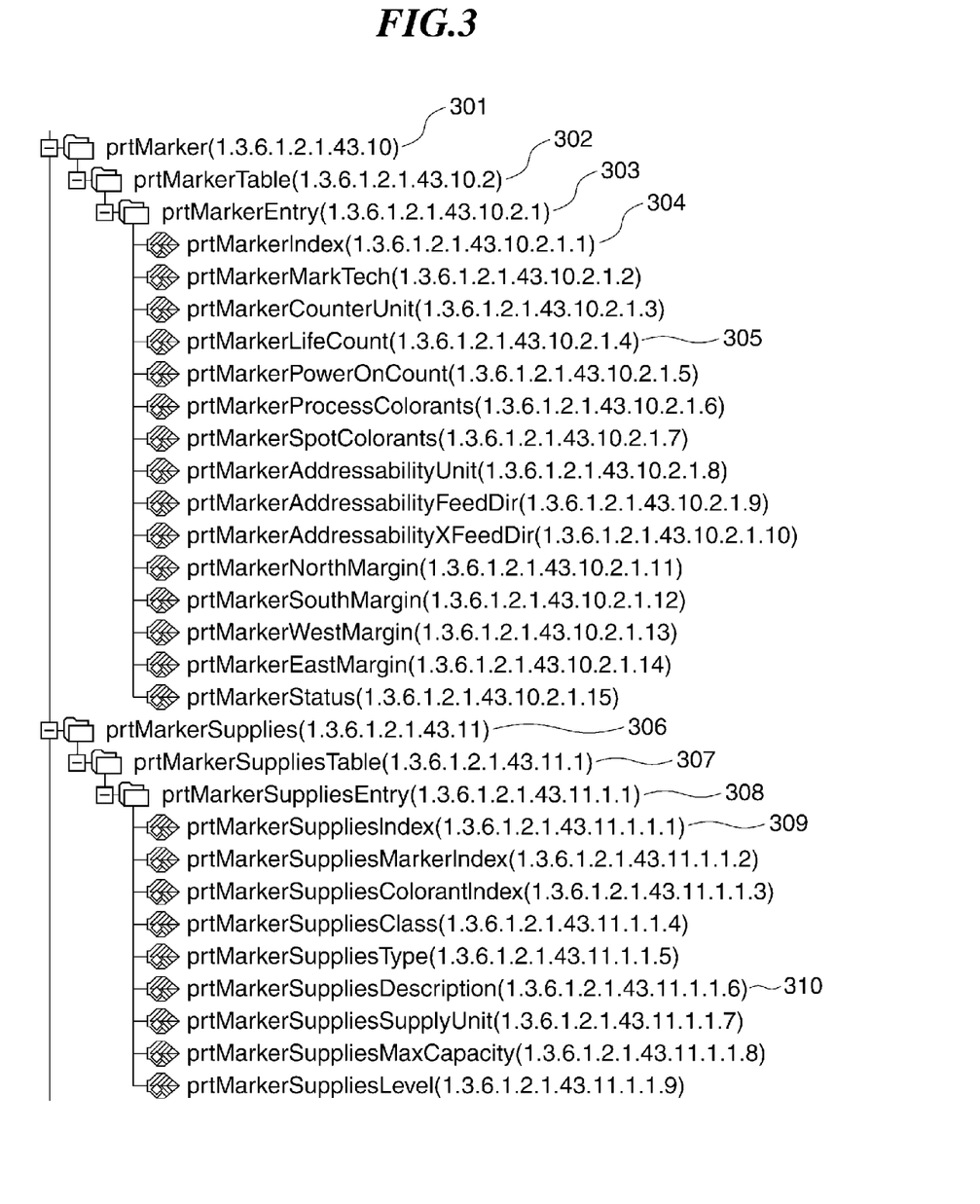
FIG. 3 is a diagram of another example of the arrangement of MIB objects in a portion of the MIB tree.

FIG. 3 is a diagram of another example of the arrangement of MIB objects in a portion of the MIB tree.

A description will be given, with reference to FIG. 3, of a MIB object "prtMarkerLifeCount" 305 and a MIB object "prtMarkerSuppliesDescription" 310 as examples of the table variable.

The MIB object "prtMarkerLifeCount" 305 has an object identifier defined by RFC 3805, and this MIB object has a subtree as illustrated in FIG. 3.

According to RFC 3805,
prtMarkerEntry OBJECT-TYPE
SYNTAX PrtMarkerEntry
ACCESS not-accessible
STATUS current
DESCRIPTION
"Entries may exist in the table for each device index who's device type is 'printer'."
INDEX {hrDeviceIndex, prtMarkerIndex}
::={prtMarkerTable 1}
prtMarkerLifeCount OBJECT-TYPE
SYNTAX Counter32
ACCESS read-only
STATUS current
DESCRIPTION
"The count of the number of units of measure counted during the life of printer using units of measure as specified by Counter Unit."
::={prtMarkerEntry 4}

It can be understood from the above that the MIB object "prtMarkerLifeCount" 305 is defined as a fourth entry in a subtree under a MIB object "prtMarkerEntry" 303. Further, as is apparent from FIG. 3, the MIB object "prtMarkerEntry" 303 is in a subtree under a MIB object "prtMarkerTable" 302, and the MIB object "prtMarkerTable" 302 is in a subtree under a MIB object "prtMarker" 301. The MIB object "prtMarkerEntry" 303 is defined as a table type having "hrDeviceIndex" and "prtMarkerIndex" 304 as INDEX information.

In a case where a network apparatus is managed in a state divided into a plurality of subunit devices, the MIB object "hrDeviceIndex" is provided as an index number for identifying a what number subunit device the information concerns. In a case where a printer has a plurality of marking devices, the MIB object "prtMarkerIndex" 304 is provided as an index number for identifying a what number marking device the information concerns.

The OID of "prtMarkerLifeCount" 305 is (1.3.6.1.2.1.43.10.2.1.4). However, since the MIB object "prtMarkerLifeCount" 305 is a table type, to indicate "prtMarkerLifeCount" 305 of a first marking device of a first device, the OID thereof is expressed as "prtMarkerLifeCount.1.1 (1.3.6.1.2.1.43.10.2.1.4.1.1)".

In actuality, it is possible to acquire a value of Printer-MIB::prtMarkerLifeCount.1.1=Counter32:643 (i.e. a counter value of 643).

Next, as another example of the same table type, a description of a MIB object "prtMarkerSuppliesDescription" 301 will be given. The arrangement of a portion of the MIB tree related to "prtMarkerSuppliesDescription" 301 is as illustrated in FIG. 3.

RFC 3805 gives the following definition:
prtMarkerSuppliesEntry OBJECT-TYPE
SYNTAX prtMarkerSuppliesEntry
ACCESS not-accessible
STATUS current
DESCRIPTION
"Attribute of a marker supply. Entries may exist in the table for each device index who's device type is 'printer'."

INDEX {hrDeviceIndex, prtMarkerSuppliesIndex}
::={prtMarkerSuppliesTable 1}
prtMarkerSuppliesDescription OBJECT-TYPE
SYNTAX OCTET STRING (SIZE (0 . . . 255))
ACCESS read-only
STATUS current
DESCRIPTION
"The description of this supply container/receptacle in the localization specified by prtGeneralCurrentLocalization."
::={prtMarkerSuppliesEntry 6}.

It can be understood from the above that the MIB object "prtMarkerSuppliesDescription" 310 is defined as a sixth entry in a subtree under a MIB object "prtMarkerSuppliesEntry" 308.

Further, as is apparent from FIG. 3, prtMarker Supplies Entry 308 is in a subtree under a MIB object "prtMarkerSuppliesTable" 307, and the MIB object "prtMarkerSuppliesTable" 307 is in a subtree under a MIB object "prtMarkerSupplies" 306.

The MIB object "prtMarkerSuppliesEntry" 308 is defined as a table type having "hrDeviceIndex" and "prtMarkerSuppliesIndex" 309 as INDEX information. In a case where a network apparatus is managed in a state divided into a plurality of subunit devices, "hrDeviceIndex" is provided as an index number for identifying what number subunit device the information concerns. In a case where a printer has a plurality of marker supplies (e.g. consumables including toner), "prtMarkerSuppliesIndex" 309 is provided as an index number for identifying what number marker supply the information concerns.

The OID of "prtMarkerSuppliesDescription" 310 is (1.3.6.1.2.1.43.11.1.1.6). However, since the MIB object "prtMarker SuppliesDescription" 310 is a table type, to indicate "prtMarker SuppliesDescription" 310 of an n-th marker supply of a first device, the OID thereof is expressed as "prtMarkerSuppliesDescription.1.n (1.3.6.1.2.1.43.11.1.1.6.1.n").

In actuality, it is possible to acquire values (character strings) of Printer-MIB::prtMarkerSuppliesDescription.1.1=STRING: "Canon Black Toner"
Printer-MIB::prtMarkerSuppliesDescription.1.2=STRING: "Canon Cyan Toner"
Printer-MIB::prtMarkerSuppliesDescription.1.3=STRING: "Canon Magenta Toner"
Printer-MIB::prtMarkerSuppliesDescription.1.4=STRING: "Canon Yellow Toner".

As is apparent from the above, as for MIB information defined as RFC standard specification, extension thereof by an individual manufacturer is inhibited so as to ensure network interoperability.

Figure 4:
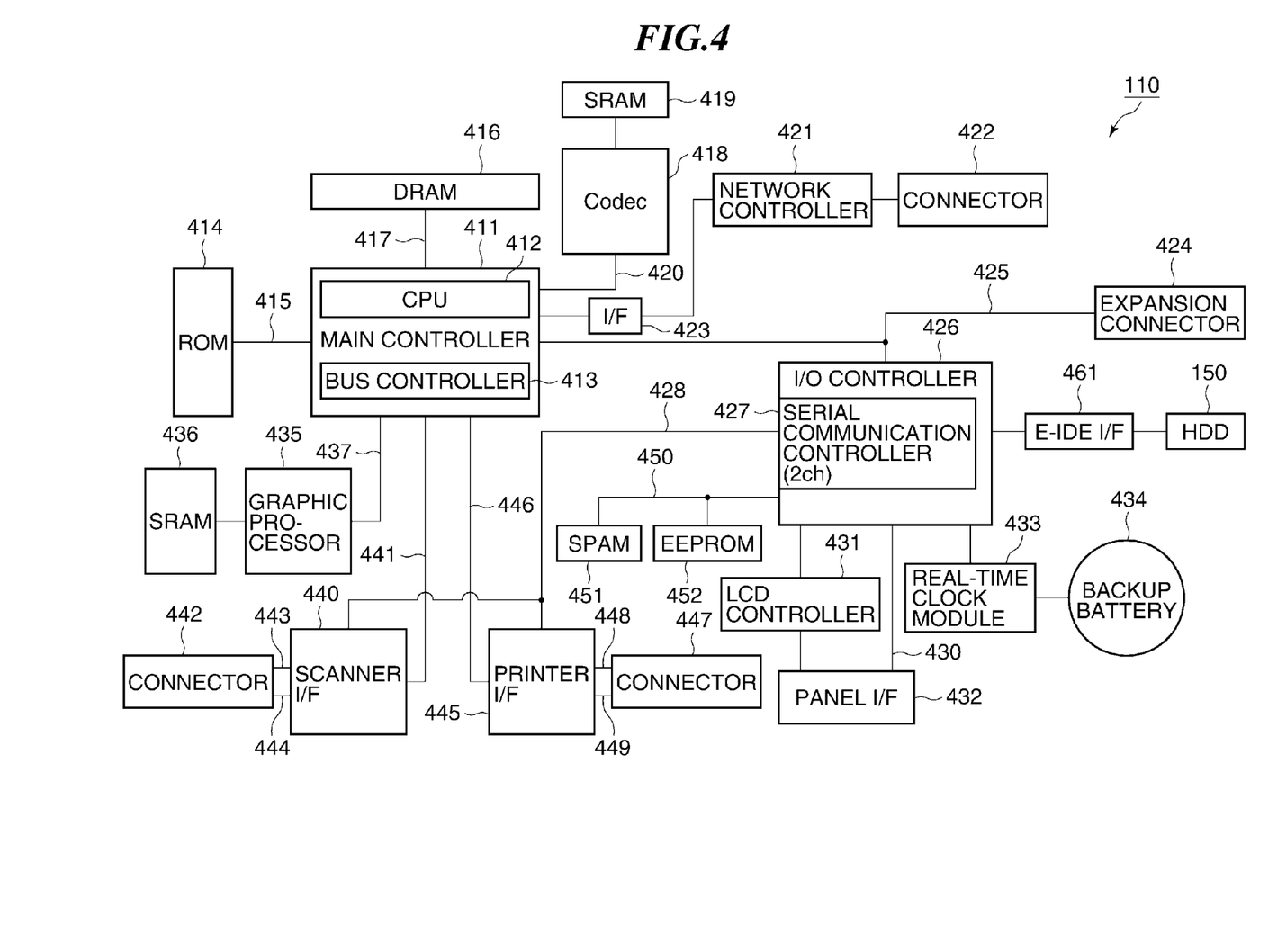
FIG. 4 is a block diagram of a controller of the MFP appearing in FIG. 1.

FIG. 4 is a block diagram of the controller 110 of the MFP appearing in FIG. 1.

Referring to FIG. 4, the controller 110 has a main controller 411. The main controller 411 includes not only a CPU 412 and a bus controller 413, but also various interface controller circuits (not shown). The CPU 412 and the bus controller 413 perform centralized control of the overall operation of the controller 110. The CPU 412 executes various processes based on programs read from a ROM 414 via a ROM interface 415. For example, the CPU 412 interprets code data (e.g. PDL (page description language)) received from the PC 161 or 162 appearing in FIG. 1, based on a program read from the ROM 414. The bus controller 413 performs data transfer-related control, such as bus arbitration and DMA data transfer, via respective associated interfaces.

A DRAM 416 is connected to the main controller 411 via a DRAM interface 417. The DRAM 416 is used as a work area for the CPU 412 or a storage area for accumulating image data.

A codec 418 compresses raster image data accumulated in the DRAM 416 by one of compression methods including MH, MR, MMR, JBIG, and JPEG. Further, the codec 418 expands compressed and accumulated code data into raster image data. A SRAM 419 is used as a temporary work area for the codec 418. The codec 418 is connected to the main controller 411 via an interface 420.

Data transfer between the SRAM 419 and the DRAM 416 is controlled by the bus controller 413, whereby DMA transfer of data is enabled.

A graphic processor 435 performs processing, such as image rotation, image magnification, color space conversion, or binarization, on raster image data accumulated in the DRAM 416. A SRAM 436 is used as a temporary work area for the graphic processor 435. The graphic processor 435 is connected to the main controller 411 via an interface 437. DMA transfer between the graphic processor 435 and the DRAM 416 is controlled by the bus controller 413, whereby DMA transfer of data is enabled.

A network controller 421 is connected to the main controller 411 via an interface 423. Further, the network controller 421 is connected to an external network (e.g. the LAN 160) via a connector 422.

A general-purpose high-speed bus 425 connects between an expansion connector 424 for connection of an expansion board and an I/O controller 426. The general-purpose high-speed bus 425 is implemented e.g. by a PCI bus. The I/O controller 426 includes two channels of asynchronous serial communication controllers 427 for transmitting and receiving control commands to and from the respective CPUs of the reader section 120 and the printer section 130 (i.e. the scanner controller 123 and the printer controller 135).

The I/O controller 426 is connected to a scanner interface 440 and a printer interface 445 by an I/O bus 428. A panel interface 432 provides interface for data transmission and reception to and from the console section 140. The panel interface 432 transfers image data received from an LCD controller 431 to the console section 140. Further, the panel interface 432 transfers a key input signal input via hard keys or a touch panel provided in the console section 140 to the I/O controller 426 via a key input interface 430.

A real-time clock module 433 is backed up by a backup battery 434 to update and store the date and time managed by the MFP 100. An E-IDE interface 461 is provided for connection between the MFP 100 and the HDD 150. The CPU 412 causes the HDD 150, via the E-IDE interface 461, to store image data, or reads image data from the HDD 150.

Connectors 442 and 447 are connected to the reader section 120 and the printer section 130, respectively. The connector 442 is connected to the scanner interface 440 via a synchronous serial interface 443 and a video interface 444, and the connector 447 is connected to a printer interface 445 via a synchronous serial interface 448 and a video interface 449.

The scanner interface 440 is connected to the reader section 120 via the connector 442. Further, the scanner interface 440 is connected to the main controller 411 via a scanner bus 441. The scanner interface 440 performs predetermined processing on image data received from the reader section 120. Further, the scanner interface 440 outputs to the scanner bus 441 a control signal generated based on a video control signal sent from the reader section 120. Data transfer from the scanner bus 441 to the DRAM 416 is controlled by the bus controller 413.

The printer interface 445 is connected to the printer section 130 via the connector 447. Further, the printer interface 445 is connected to the main controller 411 via a printer bus 446. The printer interface 445 performs predetermined processing on image data output from the main controller 411 and outputs the processed image data to the printer section 130. In a case where raster image data loaded in the DRAM 416 is transferred to the printer section 130, the data transfer is controlled by the bus controller 413. The raster image data is DMA-transferred to the printer section 130 via the printer bus 446, the printer interface 445, and the video interface 449.

A SRAM 451 is a memory which is capable of continuing storage of data by electric power supplied from a backup battery even in a state where the power of the MFP 100 is shut off. The SRAM 451 is connected to the I/O controller 426 via a bus 450. Similarly, an EEPROM 452 is a memory connected to the I/O controller 426 via the bus 450.

Figure 5:
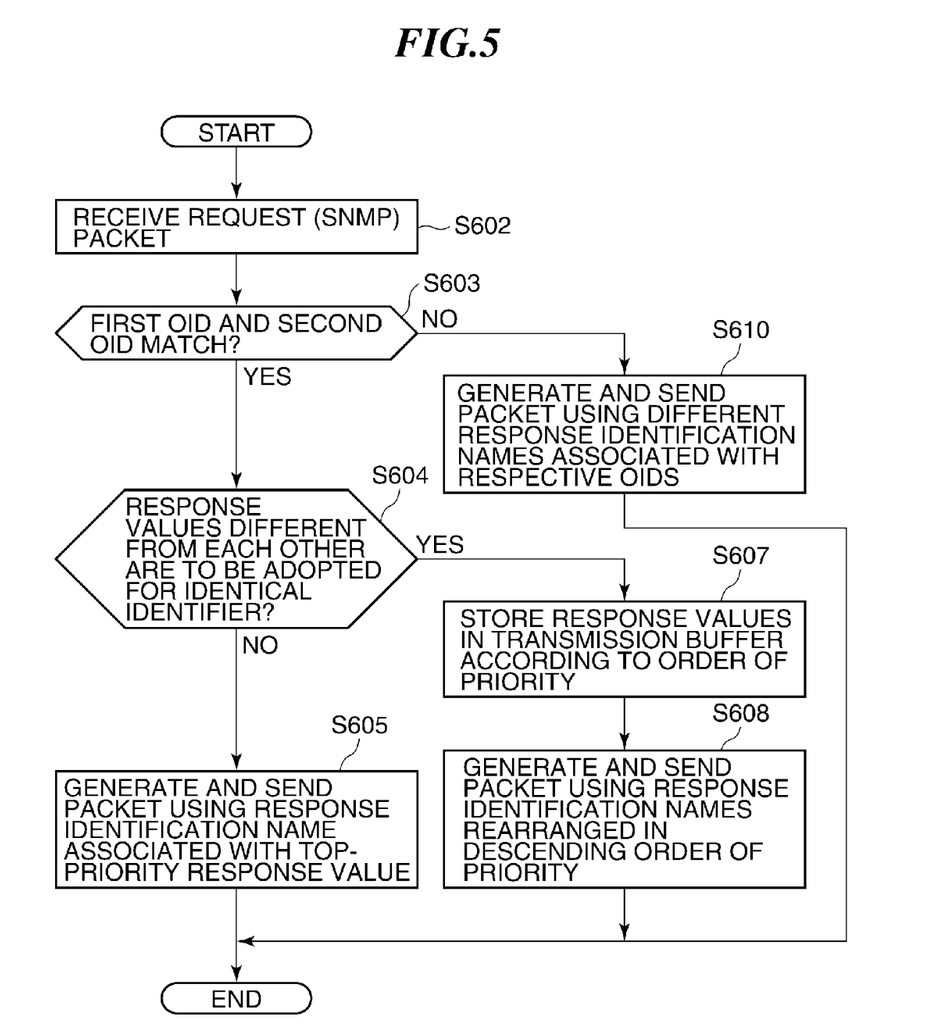
FIG. 5 is a flowchart of a response process executed when the MFP appearing in FIG. 1 receives packet data.
Figure 6:
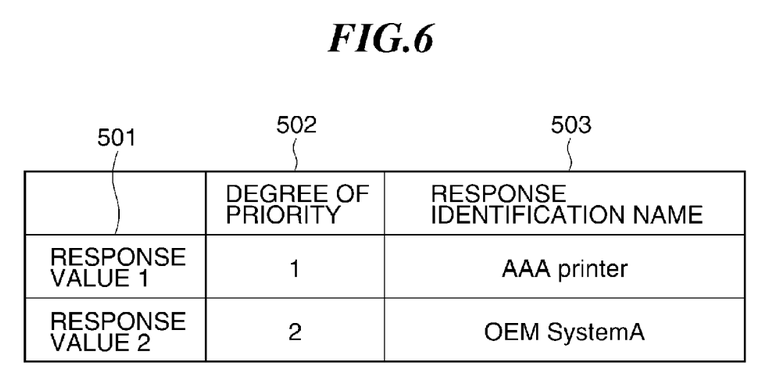
FIG. 6 is a diagram of an example of a response table recorded in advance in the MFP appearing in FIG. 1.

FIG. 5 is a flowchart of a response process executed when the MFP 100 appearing in FIG. 1 receives packet data (SNMP packet). FIG. 6 is a diagram of an example of a response table recorded in advance in the MFP 100 shown in FIG. 1. The CPU 412 reads out a program from the ROM 414 and carries out steps of the response process in FIG. 5.

The MFP 100 has the response table shown in FIG. 6. The CPU 412 refers to the response table as described hereinafter, and generates a response to received packet data. As shown in FIG. 6, the response table specifies a plurality of response values in a response value column 501 and respective degrees of priority (also referred to as "priorities") of the response values in a priority column 502. Further, the response table specifies response identification names associated with the respective response values, in a response identification name column 503. The CPU 412 controls the network controller 421 using a response identification name to output a response in the form of an SNMP packet.

Note that the user can change the degrees of priority specified in the response table, using the console section 140.

Now, when SNMP packet transmission and reception is started, the CPU 412 receives an SNMP packet (equipment information acquisition request) sent e.g. from the PC 161 (step S602). In the step S602, it is assumed that the PC 161 outputs the SNMP packet so as to acquire equipment information from the MFP 100. In other words, the SNMP packet received in the step S602 is a request packet. The request packet has single packet data including two items and is used to acquire a plurality of sysDescr information items.

Then, the CPU 412 determines whether or not a plurality of OIDs (object identifiers) contained in SNMP packet match each other (step S603).

It is assumed that SNMP packet received in the step S602 contains the following description:
data: get-request
variable-bindings: 2 item
SNMPv2-MIB::sysDesxr.0: unSpecified
SNMPv2-MIB::sysDesxr.0: unSpecified The OIDs contained in this SNMP packet match each other. Therefore, in the following step S603, the CPU 412 determines that the OIDs contained in SNMP packet match each other. In this case (YES to the step S603), the CPU 412 determines, based on a preset response condition, whether or not to select (adopt) response values different from each other for the identical OID (object identifier) (step S604). Note that the above-mentioned response condition is set in advance by the user via the console section 140.

If it is determined that response values different from each other are not to be adopted (NO to the step S604), the CPU 412 adopts a response identification name associated with a response value with a highest order of priority (i.e. with a top-priority response value) by referring to the response table illustrated in FIG. 6, and transmits an SNMP packet containing the following description:
data: get-response
variable-bindings: 2 item
SNMPv2-MIB::sysDesxr.0: AAA printer
SNMPv2-MIB::sysDesxr.0: AAA printer
as a response (step S605), followed by terminating the present response process, On the other hand, if it is determined that response values different from each other are to be adopted (YES to the step S604), the CPU 412 refers to the response table and rearranges response values in descending order of priority. Then, the CPU 412 compares between response values and a plurality of identical OIDs according to the order of the OIDs and the order of the response values to set response identification names (response values) according to the order of priority, and stores the response identification names in a transmission buffer (step S607). Further, the CPU 412 transmits, as a response, an SNMP packet containing the following description generated according to the order of the response identification names (response values) stored in the transmission buffer (step S608), followed by terminating the present process:
data: get-response
variable-bindings: 2 item
SNMPv2-MIB::sysDesxr.0: AAA printer
SNMPv2-MIB::sysDesxr.0: OEM System A Let it be assumed that in the step S602, the CPU 412 receives the following packet having single packet data including two items and generated so as to acquire sysDescr information and if Number information:
data: get-request
variable-bindings: 2 item
SNMPv2-MIB::sysDesxr.0: unSpecified
IF-MIB::Number.0: unSpecified When an SNMP packet containing a plurality of OIDs different from each other is received, the CPU 412 determines that there is no match between the OIDs contained in SNMP packet.

When it is determined that there is no match between the OIDs (NO to the step S603), the CPU 412 adopts different response values for the respective OIDs and transmits, as a response, an SNMP packet containing the following description generated using associated response identification names (values) (step S610):
data: get-response
variable-bindings: 2 item
SNMPv2-MIB::sysDesxr.0: AAA printer
SNMPv2-MIB::sysDesxr.0: OEM System A
followed by terminating the present response process.

In a case where the CPU 412 of the controller 110 of the MFP 100 thus determines that there is no match between OIDs contained in a received packet, the MFP 100 sends a response (SNMP packet) generated based on the determination, and the PC 161 or 162 as a management terminal switches processing according to response identification names contained in the response (SNMP packet) sent from the MFP 100.

As described above, according to the first embodiment, the PC 161 or 162 as a management terminal does not have to discriminate the MFP 100, which is a network apparatus, in advance, and can switch processing after receiving a response to a request packet from the MFP 100, depending on whether or not the response contains information which makes it possible to identify the MFP 100. In short, even when different information processing apparatuses use software programs different in device recognition capability, each information processing apparatus is enabled to easily manage the MFP 100.

Note that when a single packet does not specify a plurality of information identifiers (OIDs), an SNMP packet is sent back after performing processing on a response value (response identification name) in the same manner as conventionally performed, so that even when the present invention is introduced into an existing network system, the network system is by no means adversely affected.

Next, a description will be given of an example of an MFP 100 as an image processing apparatus according to a second embodiment of the present invention. In the present embodiment, history information associated with response values is stored, and when a plurality of information identifiers (OIDs) are specified in a single SNMP packet, instead of using preset response values (response identification names), there are used response values sent in the immediately preceding response process or response values updated in the MFP 100 at predetermined time intervals. The configuration of a network including the MFP 100 implementing the image processing apparatus of the second embodiment and the arrangement of the MFP 100 are identical to those in FIGS. 1 and 4, and therefore description thereof is omitted.

Figure 7:
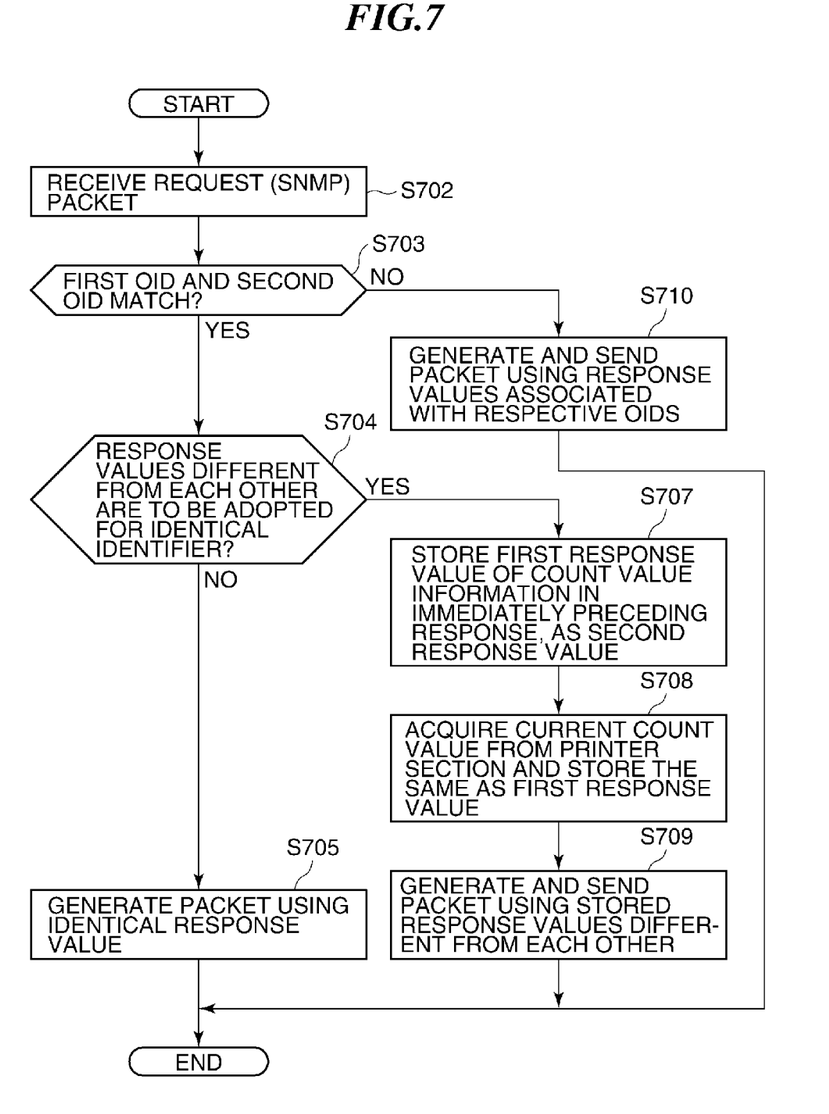
FIG. 7 is a flowchart of a response process executed by an MFP as a network apparatus according to a second embodiment of the present invention.

FIG. 7 is a flowchart of a response process executed by the MFP 100 as the image processing apparatus of the second embodiment. The CPU 412 reads out a program from the ROM 414 and carries out steps of the response process in FIG. 7.

Referring to FIGS. 1, 4, and 7, when SNMP packet transmission and reception is started, the CPU 412 receives an SNMP packet sent e.g. from the PC 161 (step S702). In the present example, it is assumed that in the step S702, the PC 161 sends out the following SNMP packet so as to acquire equipment information from the MFP 100:

data: get-request
variable-bindings: 2 item
Printer-MIB::prtMarkerLifeCount.1.1: unSpecified
Printer-MIB::prtMarkerLifeCount.1.1: unSpecified In other words, the SNMP packet transmitted in the step S702 is a request packet. The request packet has single packet data including two items and is used to acquire a plurality of "prtMarkerLifeCount.1.1" information items.

Then, the CPU 412 determines whether or not a plurality of OIDs (object identifiers) contained in the SNMP packet match each other (step S703). If it is determined that the OIDs match each other (YES to the step S703), the CPU 412 determines, based on a preset response condition, whether or not to adopt response values different from each other for the identical OID (identifier) (step S704). The response condition is set in advance by the user via the console section 140, as mentioned hereinbefore.

If it is determined that response values different from each other are not to be selected (adopted) (NO to the step S704), the CPU 412 adopts a current response value associated with "prtMarkerLifeCount.1.1" ("57" in an example shown in FIG. 7) as a response value for each OID. Then, the CPU 412 sends the following SNMP packet generated using the response value:

data: get-response
variable-bindings: 2 item
Printer-MIB::prtMarkerLifeCount.1.1: 57
Printer-MIB::prtMarkerLifeCount.1.1: 57 as a response, to the PC 161 (step S705), followed by terminating the present response process.

On the other hand, if it is determined that response values different from each other are to be adopted (YES to the step S704), the CPU 412 updates the response table (response value table) (step S707).

Figure 8:
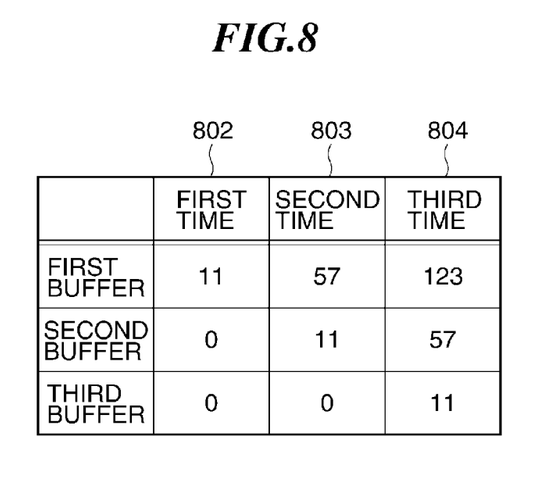
FIG. 8 is a diagram useful in explaining an example of update of a response value table in the second embodiment.

FIG. 8 is a diagram useful in explaining an example of update of the response value table in the second embodiment.

Referring to FIG. 8, the response value table is associated with a plurality of buffers, i.e. in the present example, with a first buffer to a third buffer, and information items stored in the respective first to third buffers are set as first to third response values, respectively. The first buffer is a first buffer to be used, and the second and third buffers are additional buffers.

Referring again to FIGS. 1, 4, and 7, in the case of updating the response value table, the CPU 412 stores the first response value stored in the first buffer as the second response value in the second buffer so as to use a response value used as a first response value in the immediately preceding process, as a second response value. Further, the CPU 412 stores the second response value stored in the second buffer as the third response value in the third buffer to use a response value used as a second response value in the immediately preceding process, as a third value.

In the example illustrated in FIG. 8, the first to third response values used in the immediately preceding response process are respective values shown in a "first time" column 802. In the present response process, the CPU 412 copies the response value stored in the second buffer in the third buffer, and the response value stored in the first buffer in the second buffer. In short, the CPU 412 sequentially shifts the response values stored in the respective first to third buffers from one buffer to the next.

Then, the CPU 412 stores the current value ("57" in the FIG. 7 example) of "prtMarkerLifeCount.1.1" in the first buffer, as a response value (i.e. a first response value) for a "second time" column 803 in FIG. 8. In a second and following updates, the CPU 412 performs similar processing for updating the first to third buffers, and as a consequence, the stored response values are e.g. as shown in a "third time" column 804 in FIG. 8. More specifically, the CPU 412 acquires a current print count value (123 in the present example) from the printer section 130 and stores the print count value as a first response value in the first buffer (step S708). In short, the CPU 412 stores a latest print count value as equipment information in the first buffer.

After the update of the response value table (i.e. buffer update) is thus completed, the CPU 412 generates the following SNMP packet according to the response values stored in the buffers "1" and "2":

data: get-response
variable-bindings: 2 item
Printer-MIB::prtMarkerLifeCount.1.1: 123
Printer-MIB::prtMarkerLifeCount.1.1: 57 and sends an SNMP packet (i.e. a response packet) to the PC 161 (step S709), followed by terminating the present process.

That is, the CPU 412 associates the response value stored in the first buffer with one of the OIDs and then associates the response value stored in the second buffer with the other of the OIDs to thereby generate the SNMP packet (response packet).

If it is determined in the step S703 that there is no match between the OIDs (NO to the step S703), the CPU 412 generates an SNMP packet using response values, different from each other, associated with the respective OIDs, and transmits the SNMP packet as a response (step S710), followed by terminating the present process. The PC 161 or 162 as a management terminal switches processing according to the response values contained in the response (SNMP packet) received from the MFP 100.

Figure 9:
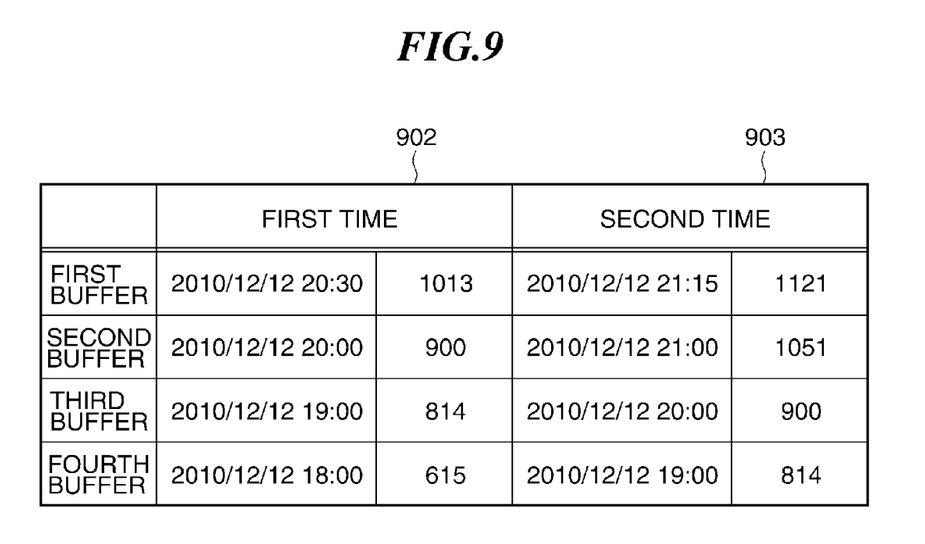
FIG. 9 is a diagram useful in explaining a variation of update of the response value table in the second embodiment.

FIG. 9 is a diagram useful in explaining a variation of update of the response value table in the second embodiment.

Referring to FIG. 9, the CPU 412 stores a current print count value in the MFP 100 (e.g. the printer section) as a response value in the first buffer. Then, the CPU 412 updates response values stored in the second and following buffers at predetermined time intervals, in the same procedure as described with reference to FIG. 8. In the FIG. 9 example, response values associated with "prtMarkerLifeCount.1.1" are shown in a "first time" column 902 and a "second time" column 903. In the present example, a current print count value is stored in the first buffer, and in the second and following buffers, the response values are updated at time intervals of one hour.

Note that the time interval may be set by the user via the console section 140.

As described above, according to the second embodiment, the PC 161 or 162 can not only refer to a current print count value in the MFP 100, but also refer to preceding (past) print count values as history information. This makes it possible to check the status of the MFP 100 at predetermined time intervals, as well as to easily check differences between printing sheet counts (i.e. each printing sheet count per predetermined time period).

As is apparent from the above description, the controller 110 appearing in FIG. 1 corresponds to a determination unit, a decision unit, and a response unit of the present invention. Further, the controller 110 and the console section 140 correspond to a setting unit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

For example, the functions of the above-described embodiments can be used as a control method to be executed by the MFP 100 as a network apparatus. Alternatively, the functions of the above-described embodiments may be performed by a plurality of apparatuses on the network in a distributed manner instead of being performed by a single network apparatus. More specifically, some steps of the flowchart in FIG. 5 or 7 may be configured to be executed not by the MFP 100, but by an external apparatus on the network. Further, it is possible to cause a computer provided in the MFP 100 as a network apparatus to execute a program including the functions of the above-described embodiments, as a control program. Note that the control program is recorded e.g. in a computer-readable storage medium.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

This application claims priority from Japanese Patent Application No. 2011-167040 filed Jul. 29, 2011, which is hereby incorporated by reference herein in its entirety.

What is claimed is:

1. A network apparatus connectable to a management terminal via a network, the network apparatus comprising:
   a processor; and
   a memory storing instructions which, when executed, cause the network apparatus to:
      send back a response containing equipment information in response to a request transmitted from the management terminal;
      determine, when the request is received from the management terminal, whether or not a plurality of identical object identifiers are contained in the request;
      decide, when it is determined that a plurality of identical object identifiers are contained in the request, whether or not to send back different items of the equipment information in association with the respective identical object identifiers; and
      send back a response containing the equipment information according to the decision.

2. The network apparatus according to claim 1, wherein the instructions further cause the network apparatus to:
   store degrees of priority of respective items of the equipment information in a storage medium; and
   select the object identifiers according to the degrees of priority stored.

3. The network apparatus according to claim 2, wherein the instructions further cause the network apparatus to:
   set a response condition for specifying whether or not to send back different items of the equipment information in association with the respective identical object identifiers; and
   when the response condition specifies that identical equipment information is to be associated with the identical object identifiers, select a highest-priority one of the items of the equipment information stored in the storage medium.

4. The network apparatus according to claim 3, wherein the instructions further cause the network apparatus to, when the response condition specifies that items of equipment information different from each other are to be associated with the respective identical object identifiers, select items of the equipment information according to the degrees of priority stored in the storage medium.

5. The network apparatus according to claim 3, wherein the storage medium includes:
   a first buffer for storing a current item of the equipment information on the network apparatus; and
   at least one additional buffer for storing past items of the equipment information preceding the current item of the equipment information, as preceding items of the equipment information, and
   wherein when the response condition specifies that the items of the equipment information different from each other are to be associated with the respective identical object identifiers, the instructions further cause the network apparatus to sequentially shift items of the equipment information stored in the first buffer to the additional buffers, and to store a latest item of the equipment information in the first buffer, to thereby perform buffer update, and thereafter, to associate the item of the equipment information stored in the first buffer with one of the object identifiers and to sequentially associate a remaining item of the equipment information stored in the additional buffers with the others of the object identifiers.

6. The network apparatus according to claim 5, wherein the instructions further cause the network apparatus to perform the buffer update at predetermined time intervals.

7. The network apparatus according to claim 1, wherein the network apparatus is an image forming apparatus that forms an image based on image data.

8. A method of controlling a network apparatus connectable to a management terminal via a network, comprising:
   sending back a response containing equipment information in response to a request transmitted from the management terminal;
   determining, when the request is received from the management terminal, whether or not a plurality of identical object identifiers are contained in the request;
   deciding, when it is determined that a plurality of identical object identifiers are contained in the request, whether or not to send back different items of the equipment information in association with the respective identical object identifiers; and
   sending back a response containing the equipment information according to the decision.

9. A non-transitory storage medium storing a computer-readable program for causing a computer to execute a method of controlling a network apparatus connectable to a management terminal via a network,
   wherein the method comprises:
   sending back a response containing equipment information in response to a request transmitted from the management terminal;
   determining, when the request is received from the management terminal, whether or not a plurality of identical object identifiers are contained in the request;
   deciding, when it is determined that a plurality of identical object identifiers are contained in the request, whether or not to send back different items of the equipment information in association with the respective identical object identifiers; and
   sending back a response containing the equipment information according to the decision.

* * * * *